Sept. 15, 1959 J. LYSOBEY 2,903,743
MANUFACTURE OF FLEXIBLE-WALLED TUBING
Filed Jan. 18, 1954 3 Sheets-Sheet 2
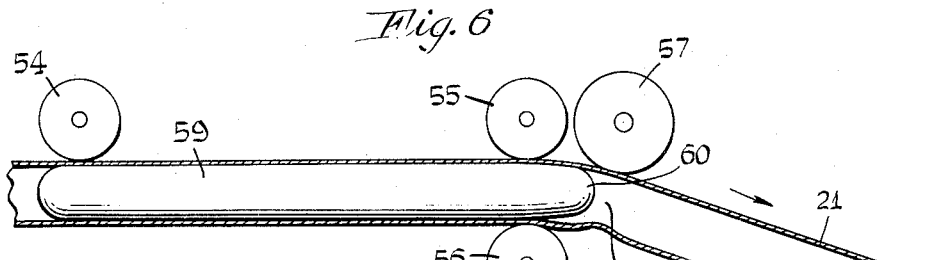
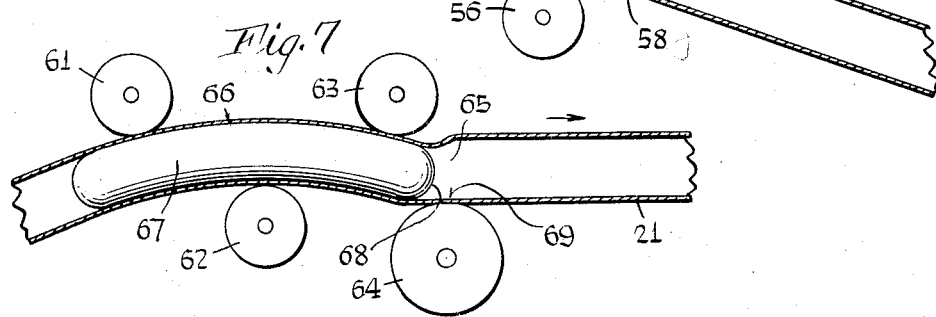
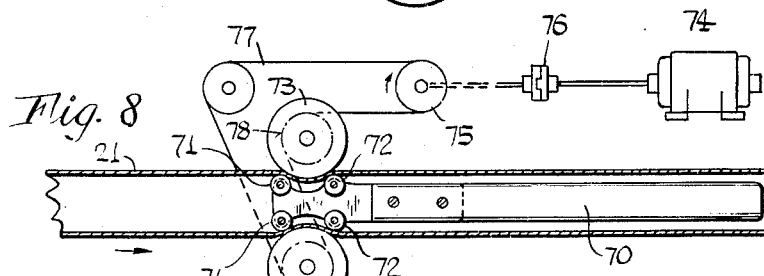
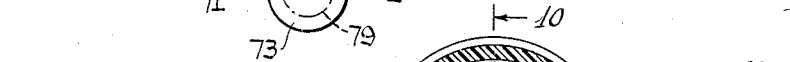
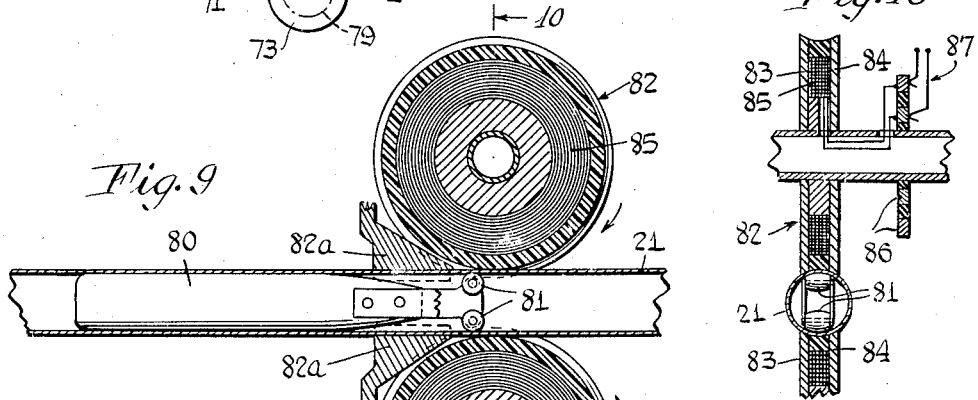
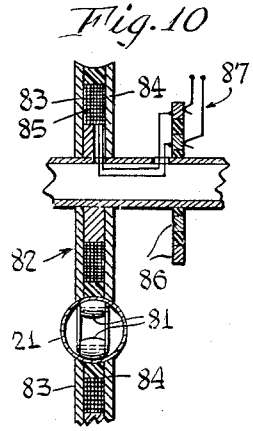
INVENTOR.
John Lysobey
BY
Johnson and Kline
ATTORNEYS

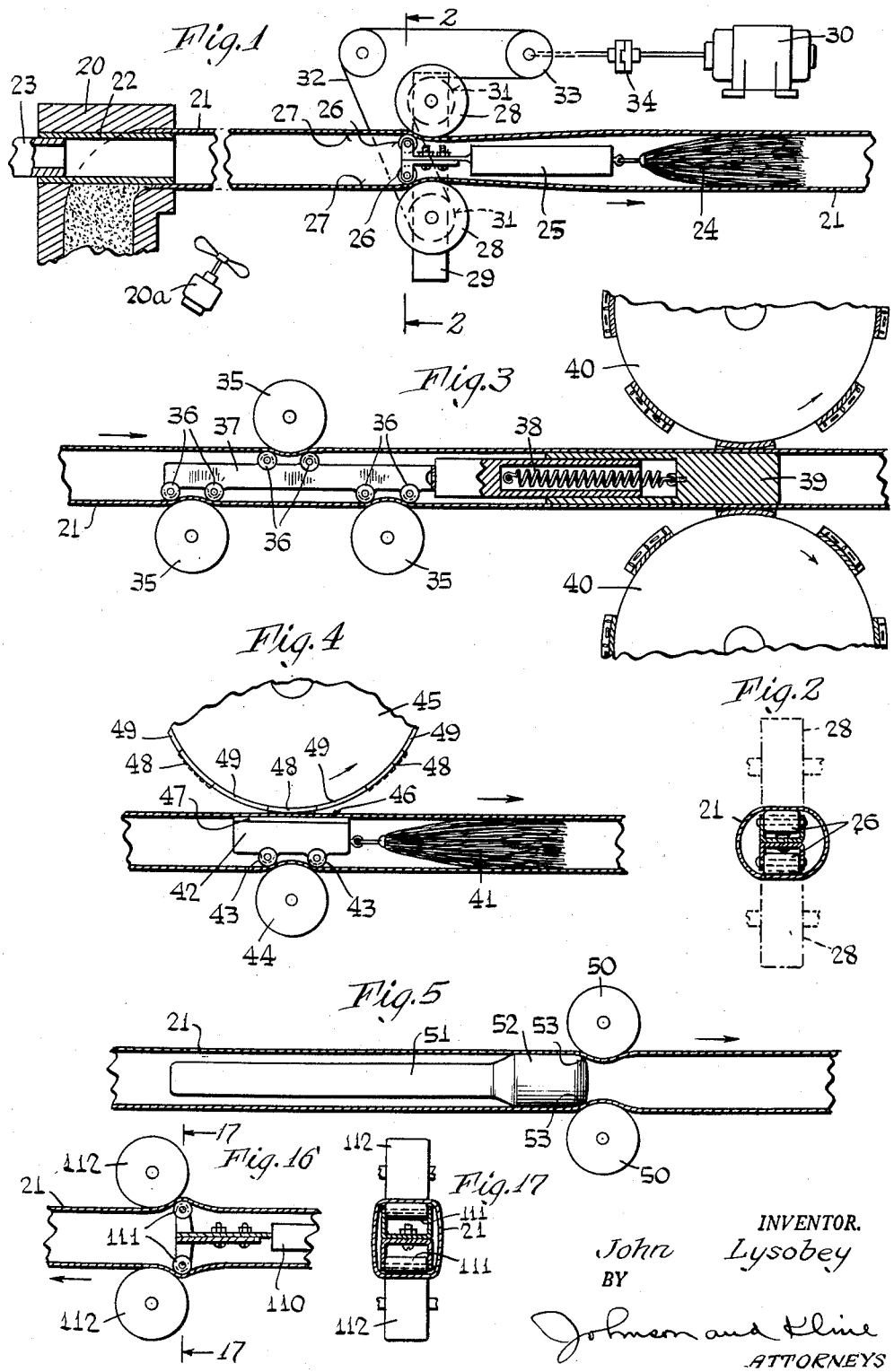

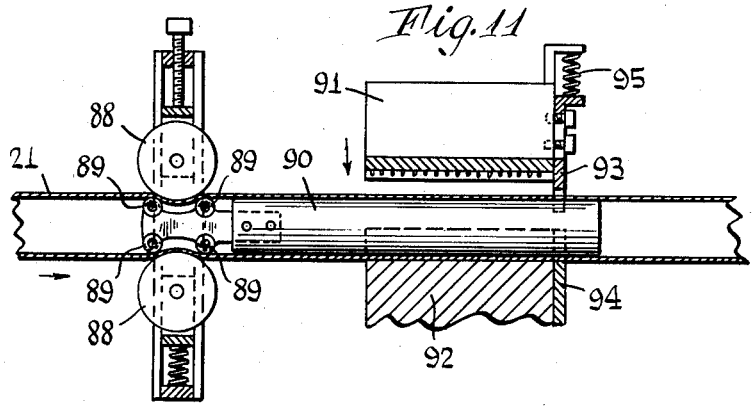
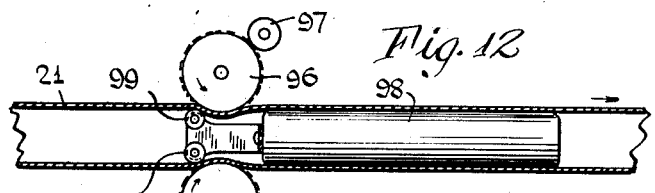
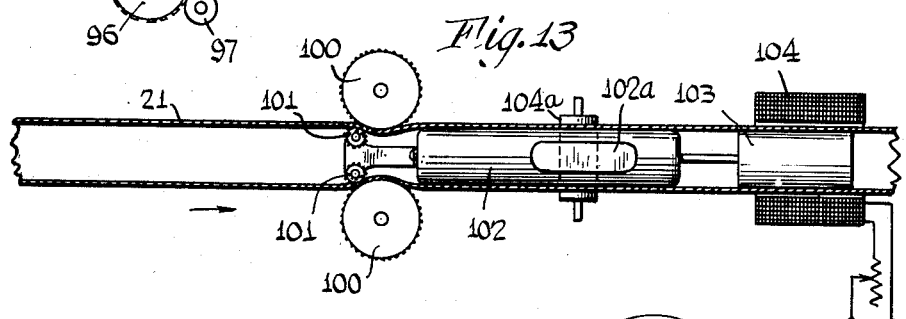
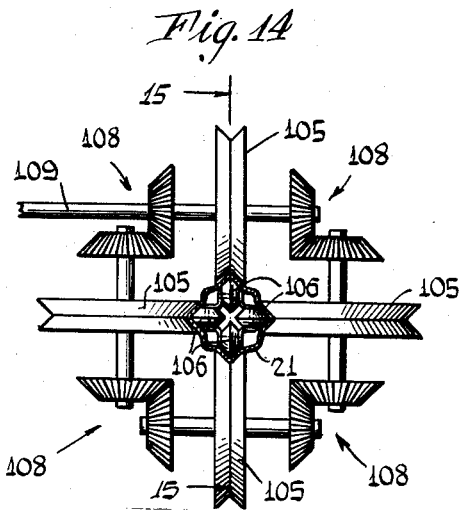
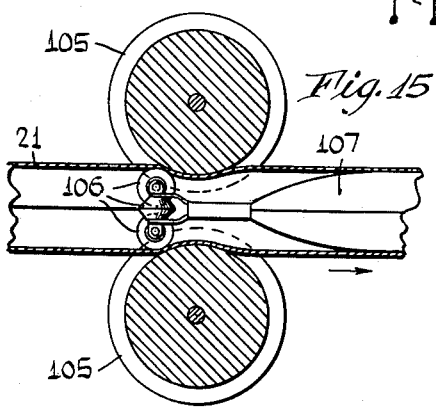
INVENTOR.
John Lysobey
BY
Johnson and Kline
ATTORNEYS

United States Patent Office 2,903,743
Patented Sept. 15, 1959

2,903,743

MANUFACTURE OF FLEXIBLE-WALLED TUBING

John Lysobey, Norwalk, Conn.

Application January 18, 1954, Serial No. 404,451

3 Claims. (Cl. 18—19)

This invention relates to the manufacture of flexible-walled tubing, and more particularly to working and performing operations on extruded plastic tubing after it emerges from the extrusion apparatus.

Heretofore it has been the practice, in the extrusion of thin-walled plastic tubing, to prevent collapse of the walls of the tubing until the plastic material has set by maintaining a greater air pressure within the tubing. Compressed air is introduced through a pipe connected to the core of the extruding die, and the escape of air from the tubing is controlled by a floating plug maintained in the tubing at a point remote from the extrusion die. This floating plug, in the past, has embodied a magnetic core which is held in a predetermined position in the tubing, even though the latter is continuously travelling axially, by an electrically-energized magnet coil surrounding the tubing.

While the above method and apparatus for preventing collapse of the wall of the tubing has in general proved to be satisfactory, it is somewhat costly in that the magnet coils are expensive due in large part to the substantial amount of copper involved in their manufacture, and also because different sizes of coils are required for different diameters of tubing. In addition to this disadvantage, there is a tendency for the magnetic core or plug in the tubing to shift back and forth somewhat and not remain perfectly still, and also the heat generated by the coil is undesirable in its effect on the plastic material of the tubing.

The above disadvantages and drawbacks of this prior system of maintaining air pressure in extruded plastic tubing are eliminated by the present invention, and an object of the invention is to provide an improved method and apparatus for controlling the escape of compressed air from plastic tubing which is being extruded.

A further object of the invention is to provide a simple and economical means for holding a plug in plastic tubing which is leaving the extruding machine, to maintain a predetermined desired air pressure in the tubing for preventing collapse of the tubing walls.

The use of a magnetic retainer coil for maintaining a member within plastic tubing emerging from an extruding machine is shown in my Patent No. 2,600,254 issued June 10, 1952, entitled "Wall Treatment of Tubing." In this patent there are disclosed various means by which printing, embossing, etc., may be performed on the walls of extruded plastic tubing, in conjunction with members maintained inside of the tubing by magnetic coils.

A further object of the invention is to provide an improved means for performing printing or embossing operations on the walls of plastic tubing, involving the use of a die member or bed within the tubing which does not require magnetic coils and their attendant disadvantages.

Still another object of the invention is to provide an improved, simplified means for reliably feeding plastic tubing after it has emerged from the extrusion machine.

A still further object of the invention is to provide an improved and simplified means for shaping, in cross section, the walls of plastic tubing emerging from an extrusion machine, to cause the tubing to have various desired cross-sectional configurations.

Still another object of the invention is to provide an improved and simplified means by which the functions of maintaining air pressure in plastic tubing, feeding the plastic tubing, and performing operations on the walls of plastic tubing may be variously combined.

Yet another object of the invention is to provide means in accordance with any or all of the foregoing, which are extremely simple and economical in construction, and reliable in operation.

A feature of the invention resides in the provision of improved means as above set forth, wherein certain components may be used with various sizes or diameters of tubing, changes being required only in other components to accommodate the various sizes, thereby effecting an economy where the production schedule involves a number of different tube diameters.

Other features and advantages will hereinafter appear.

In the accompanying drawings:

Figure 1 is a view partly in elevation and partly in vertical section of an apparatus made in accordance with the invention for maintaining air pressure within extruded plastic tubing and at the same time for feeding the said tubing.

Fig. 2 is a transverse sectional view taken on line 2—2 of Fig. 1.

Fig. 3 is a view partly in elevation and partly in vertical section of an apparatus embodying the invention wherein embossing operations are performed on the walls of the plastic tubing.

Fig. 4 is an elevational view and sectional view showing another embodiment of the invention, wherein a pressure-maintaining plug is held captive in a plastic tube and printing performed on the walls of the tube.

Fig. 5 is an elevational and sectional view of another embodiment of the invention relating to the maintenance of air pressure in the tube.

Figs. 6 and 7 are elevational and sectional views of two further embodiments of the invention, relating to maintenance of air pressure within the tube.

Fig. 8 is an elevational and sectional view of still another embodiment of the invention, relating to feeding of the tube.

Fig. 9 is an elevational and sectional view of another embodiment of the invention, involving the use of magnetized external rollers in conjunction with a pressure-maintaining plug located inside of the tubing.

Fig. 10 is a sectional view taken on line 10—10 of Fig. 9.

Fig. 11 is an elevational and sectional view of yet another embodiment of the invention relating to periodic halting of travel of the tubing and the performance of printing operations thereon.

Fig. 12 is an elevational and sectional view of still another embodiment of the invention relating to the maintenance of air pressure within the tubing and the printing of indicia thereon by printing rollers.

Fig. 13 is an elevational and sectional view of another embodiment of the invention relating to the embossing of walls of the tubing by dies operating under a variable, controlled force.

Fig. 14 is a view in elevation and in transverse section of an apparatus embodying the invention, relating to forming of the walls of the tubing after its extrusion.

Fig. 15 is a view partly in elevation and partly in vertical section taken on line 15—15 of Fig. 14.

Fig. 16 is a view partly in elevation and partly in vertical section of an apparatus embodying the invention, wherein a member within the extruded plastic tubing bends outward opposite wall portions of the tubing against cooperable outer members.

Fig. 17 is a transverse section taken on line 17—17 of Fig. 6.

Referring to Fig. 1 there is shown an extrusion die 20 from which extruded plastic tubing 21 emerges, the die having a hollow core member 22 connected with a compressed air line 23 by which air pressure in the tubing 21 is raised to prevent collapse of the walls of the tubing.

In accordance with the present invention a novel, improved and simplified means is provided for controlling the discharge of air from the tube 21, and also for feeding or traveling the tubing after the material thereof has set. This means comprises a plug or tassel 24 disposed within the tubing 21 and composed of suitable fibers or strands, the plug being attached to a member 25 having a pair of generally cylindrical rollers 26 disposed on parallel axes so as to engage opposite inside walls 27 of the tubing, see Fig. 2.

Cooperable with the rollers 26 are large external rollers 28 mounted on a suitable framework 29, the rollers 28 being spaced apart a distance somewhat less than the diameter of the tubing 21, and less than the space between the outermost peripheral portions of the rollers 26. By this construction, referring to Fig. 2, the opposite walls of the tubing 21 which are engaged by the rollers 26 and 28 are flattened and made somewhat parallel, said flattened wall portions being bent inward against the rollers 26.

Any suitable cooling means such as a fan 20a may be provided for cooling and partially setting those portions of the tubing 21 located between the extrusion die 20 and the rollers 28.

I refer hereinafter, particularly in the claims, to the plug 24 and member 25 as an "unattached" member disposed within the tubing 21 since this assemblage is not connected or attached in any way to a frame or other supporting member but instead is free for movement within the tubing except as it might be restricted by inwardly bent wall portions of the tubing. I also refer to the rollers 28 as "anchored" members, since they are carried by the frame member 29 and cannot shift out of their given positions but can only rotate about fixed axes.

While in Figs. 1 and 2 the member 25 is shown as having rollers 26 presenting sloping surfaces the active portions of which face in the direction of movement of the tube, I have found that the rollers may be replaced by non-movable or nonrotatable sloping surfaces, as will be later disclosed in modifications of the invention, without rendering my apparatus inoperative. Referring to Fig. 1, the large rollers 28 are so closely spaced together as to prevent the rollers 26 from passing between the large rollers from left to right, and therefore the member 25 and plug 24 will be held captive in the tubing 21 during continued left to right travel of the tubing. During such action, the rollers 26 and 28 in the pairs will rotate in opposite directions, the peripheral surfaces thereof traveling virtually without slipping at the same rate of speed as the tubing 21. By this construction I am able to maintain the tassel or plug 24 at a predetermined desired position in the tubing 21, and by virtue of the plug blocking or obstructing the air passage of the tubing the pressure of air within the tubing between the extrusion die 20 and the plug 24 will be maintained, as determined by the closeness of the fit between the plug 24 and tubing 21, by the amount of leakage permitted, and by the rate at which air is supplied to the tubing from the line 23. The plug 24 and member 25 are always maintained in a given fixed position and will not deviate therefrom even the slightest amount, and I have found that the tubing 21 will travel between the rollers 26 and 28 with but very little hindrance and without suffering permanent deformation, or being marked, scratched, etc.

The rollers 26 and 28 are preferably highly polished, and are provided with rounded ends as shown in Fig. 2.

With the apparatus shown in Fig. 1 different sizes of tubing 21 may be readily accommodated by the rollers 28 if the latter are made adjustable as to their spacing. It is only necessary to replace the inner plug member 24, 25 and rollers 26 with different sizes and spacings, to accommodate different diameters of tubing and this is much more economical than the prior practice of using different magnet coils for different tube sizes. The cost of a plug assembly comprising the parts 24, 25 and the rollers 26 is much less than the cost of a magnet coil with its large amount of copper and fabrication expense.

If desired, the spacing between the rollers 26 may be made adjustable by mounting them on separate members bolted together as shown in Fig. 1. With this arrangement the provision of washers between the members carrying the rollers 26 will space the latter apart a greater extent, thereby adapting the inner or plug member 24, 25 to larger diameters of tubing within limits, thereby effecting a still greater economy.

If desired, the rollers 28 may be power driven from a motor 30 by providing sprockets 31 on the shafts of the rollers, accommodating a sprocket chain 32 passing over a drive sprocket 33 connected to the motor 30 through a suitable clutch 34. With this organization a desirable auxiliary feeding of the tubing 21 is effected.

It will be noted that, due to the cylindrical shapes of the rollers 26 and 28, the opposite wall portions of the tubing 21 which are bent inward are semicylindrical transversely of the tubing, and the assemblage comprising the plug 24, member 25 and rollers 26 is prevented from turning about the axis of the tubing 21.

Another embodiment of the invention is shown in Fig. 3, wherein plastic tubing 21 passes between three external rollers 35 cooperable respectively with pairs of internal rollers 36 carried on an unattached member 37 resiliently connected by means of a spring 38 with an internal die or platen member 39 which is cooperable with printing rollers 40. The rollers 40 print at intervals, and during such printing intervals the platen member 39 travels with the tubing 21 as permitted by the spring 38. During the non-printing intervals, the platen member 39 snaps back to its starting position from that shown in Fig. 3, as effected by the spring 38 and the member 37 which latter is at all times held captive by the rollers 35.

Yet another embodiment of the invention is shown in Fig. 4, wherein a tassel 41 and member 42 having rollers 43 are disposed within the tubing 21. Cooperable with the rollers 43 is a roller 44, and with the member 42 is a large printing roller 45. The member 42 preferably has a highly polished upper surface 46 enabling it to slide easily on the tubing even though it frictionally engages the inside wall thereof; printing may thus be done on the exterior wall surfaces of the tubing without requiring the tubing to halt in its travel or the member 42 to travel with the tubing. The member 42 may be faced with a strip 47 of low-friction plastic such as tetrafluorethylene, if desired. The printing roller 45 has peripheral segments 48 provided with type faces, and has other, non-printing segments 49 disposed between the printing segments 48, having smooth faces.

Still another embodiment of the invention is shown in Fig. 5. In this figure, plastic tubing 21 passes between constricting rollers 50, and within the tubing 21 there is an unattached member 51 having an enlarged head 52 provided with sloping surfaces 53 facing in the direction of travel of the tubing. The rollers 50 bend inward the walls of the tubing against the sloping surfaces 53 of the unattached member 51, thereby maintaining the member in its predetermined fixed position and preventing travel of the member with the tubing. Preferably the surfaces 53 are highly polished or else made of a low-friction material such as tetrafluorethylene or the like. The member 51 with the enlarged head 53 thereby maintains air pressure in those portions of the tubing 21 which are located to the left of the rollers 50.

Another embodiment of the invention is shown in Fig. 6, wherein plastic tubing 21 passes between rollers 54, 55, 56 and 57 which are so located as to cause a slight bend 58 in the tubing. An unattached member 59 is disposed within the tubing 21, having a sloping surface 60 facing in the direction of travel of the tubing, the roller 57 bending inward the wall of the tubing against the sloping surface 60, thereby holding the member 59 captive in the position shown while the tubing 21 continues to travel from left to right. The member 59 may be advantageously constructed of wood, and preferably has polished outer surfaces to promote slipping when engaged with the inside walls of the tubing 21.

Yet another embodiment of the invention is shown in Fig. 7, wherein flexible-walled plastic tubing 21 passes between rollers 61, 62, 63 and 64 so arranged as to cause a bend 65 in the tubing 21 and also a curved section 66. Within the tubing 21 a curved elongate member 67 is provided, disposed in the curved section 66 of the tubing between the rollers 61, 62 and 63 and having a sloping surface 68 facing in the direction of travel of the tubing adjacent the roller 64. A wall portion 69 of the tubing 21 is bent inward by the roller 64 against the sloping surface 68 of the member 67, thereby maintaining said member in the position shown despite travel of the tubing 21 from left to right.

Still another embodiment of the invention is shown in Fig. 8, wherein a novel improved and simplified feeding means is provided for flexible-walled plastic tubing 21. This feeding means comprises an unattached member 70 disposed within the tubing 21, having pairs of rollers 71 and 72 cooperating with external feed rollers 73, the latter bending inward opposite wall portions of the tubing 21 against the rollers 71 and 72. A motor 74 powers a drive sprocket 75 through a clutch 76, the sprocket operating a chain 77 passing around sprockets 78 and 79 attached to the feed rollers 73 for operating the latter to feed the tubing 21 from left to right. This feed mechanism is extremely effective and reliable, is relatively simple in construction and is readily adapted to different sizes of tubing by adjustably mounting the rollers 71, 72 and 73. By virtue of substantial portions of the peripheries of the feed rollers 73 engaging the walls of the tubing 21, appreciable pressure may be utilized to prevent slippage of the feed mechanism.

Another embodiment of the invention is shown in Figs. 9 and 10 wherein an unattached internal member is made of magnetic material and is held in a predetermined position within a moving tube by exterior electro-magnetic means. As shown, a flexible-walled plastic tube 21 has disposed within its bore an unattached member 80 having a pair of rollers 81 of magnetic material such as iron or steel. Cooperable with the rollers 81 are exterior rollers 82 made in the form of magnets, having north and south pole sections 83 and 84 respectively and an energizing coil 85 supplied with electricity through slip rings 86 and brushes 87. When the rollers 82 are magnetized they will attract the rollers 81 and thereby maintain the member 80 in a given predetermined position within the tube while the latter is moving axially. Where the walls of the tubing are quite thin or flexible, exterior supporting members 82a may be provided, to prevent undue bending of said walls. In some cases it will suffice to have just one magnet 82 and one armature, for instance in the form of a roller such as the roller 81, to hold the unattached member 80 in desired position.

Still another embodiment of the invention is shown in Fig. 11 wherein printing or embossing of the wall of the tubing is accomplished at spaced intervals, such operation being accompanied by halting of the tubing. As shown, rollers 88 are disposed on opposite sides of flexible-walled plastic tubing 21, being cooperable with inner rollers 89 carried on an unattached member 90 which also constitutes a platen for cooperation with a printing or embossing die 91 mounted for vertical advancing and retracting movement. Opposite the die 91 is an external platen 92, and gripping plates 93 and 94 are provided on the members 91 and 92 for engagement with the tubing 21 to halt the travel thereof. The gripper 93 is movably mounted on the member 91 and urged downward by a spring 95, being thereby yieldable after it has engaged the tubing 21 to permit continued downward advancing movement of the die member 91. The grippers 93 and 94 thereby halt the tubing 21 prior to engagement of the tubing by the die member 91, and again release the tubing upon retraction of the die member 91.

Still another embodiment of the invention is shown in Fig. 12. In this figure a flexible-walled plastic tubing passes between printing rollers 96 supplied by inking rollers 97. Within the tubing 21 an unattached member 98 is provided, having rollers 99 cooperable with the printing rollers 96 to position the member 98 and hold it stationary while the tubing 21 is traveling from left to right.

In Fig. 13 another embodiment of the invention is shown wherein variable force may be exerted on embossing rollers adapted to form the walls of plastic tubing. In this figure the tubing 21 passes between embossing rollers 100 cooperable with internal embossing rollers 101 carried by a member 102 connected with a magnetic core 103 which is influenced by a magnet coil 104. Varying the energization of the coil 104 will vary the magnetic pull on the core 103 and thereby vary the pressure between the rollers 100 and 101 to regulate the degree of embossing of the tubing 21.

The member 102 may have oppositely located flat surfaces 102a, and a pair of oppositely disposed rollers 104a may be arranged to engage opposite exterior walls of the tube 21 and bend the walls inward into engagement with the flats 102a, thereby preventing turning of the member 102 inside of the tubing 21.

In Figs. 14 and 15 another embodiment of the invention is shown wherein novel shaping means are provided for imparting predetermined cross sectional shapes to flexible-walled plastic tubing. In these figures the tubing 21 passes between external shaping rollers 105 and internal shaping rollers 106, the latter being carried by an unattached member 107 within the tubing 21. The external rollers 105 may be power driven through bevel gearing 108 and a shaft 109 from suitable motive means. As shown in Fig. 14 the rollers 105 and 106 are shaped to provide square corners in the walls of the plastic tubing 21, said tubing preferably being given such shape initially by the extruding die.

Another embodiment of the invention is shown in Figs. 16 and 17, wherein an interior, unattached member bends outward opposite wall portions of the tubing. As shown, an unattached member 110 having rollers 111 is disposed within flexible-walled tubing 21, the rollers 111 being spaced apart a sufficient distance to make the dimension between the most remote portions of the rollers greater than the inside diameter of the tubing. Exterior rollers 112 are provided for cooperation with the inner rollers 111, the exterior rollers being anchored, that is, mounted so as to rotate about fixed axes, and bending inward the opposite wall portions of the tubing 21 against sloping surfaces presented by the inner rollers 111. Thus the unattached member 110 is maintained in a predetermined position within the tubing 21. This arrangement, as with all of the above constructions, may be utilized for the functions of feeding the tubing, maintaining air pressure within the tubing, and working on the walls of the tubing.

In each of the examples set forth above the bending of the walls of the tubing prevents turning of the inner, unattached member, and this is of particular advantage where operations are performed on the tubing walls.

By the above structures I have provided novel, simplified and effective means for working and performing operations on extruded plastic tubing after it emerges from the extrusion apparatus, and for controlling the escape of air introduced into the tubing for the purpose of preventing collapse of the tubing walls. With my improved apparatus various sizes of tubing may be handled without requiring costly changes, thereby effecting a desirable economy. When employed as a feed mechanism, my apparatus provides a simple and reliable means for effecting a controlled axial travel of flexible-walled tubing.

Variations and modifications may be made within the scope of the claims and portions of the improvements may be used without others.

I claim:

1. Apparatus for use with a flexible-walled thermoplastic tube moving lengthwise in one direction, comprising an unattached member adapted to be disposed within said tube, having a roller forming a surface sloping inwardly in the direction of movement of the tube; an anchored member adapted to be disposed outside of said tube adjacent said unattached member, said members being engageable with opposite inner and outer wall surfaces respectively of the tube and the anchored member being capable of bending the wall of the tube inward against the sloping surface of the unattached member; the outermost portion of the unattached member plus the thickness of the tubing being further outwardly than the innermost portion of the anchored member; and means adapted to engage the exterior of the tube, for preventing lateral movement of said tube and unattached member in a direction away from said anchored member, the latter thereby being capable of maintaining said unattached member in a predetermined position in the tube against travel with the tube.

2. The invention as defined in claim 1 in which there is a roller adapted to engage the exterior of the tube and having means on its periphery for performing an operation on said tube, and in which there is a member adapted to be disposed within the tube and cooperable with said operation-performing roller, said cooperable member being connected with said unattached member for positioning thereby.

3. The invention as defined in claim 1 in which the means for preventing lateral movement of the tube and unattached member comprises a roller adapted to engage the tube and having means on its periphery for performing operations on the tube, said unattached member cooperating with said operation-performing roller.

References Cited in the file of this patent

UNITED STATES PATENTS

| | | |
|---|---|---|
| 1,440,007 | Freeman et al. | Dec. 26, 1922 |
| 1,548,505 | Becker | Aug. 4, 1925 |
| 1,820,649 | Burnish | Aug. 25, 1931 |
| 2,320,564 | Brooks | June 1, 1943 |
| 2,339,286 | Moule | Jan. 18, 1944 |
| 2,377,908 | Slaughter | June 12, 1945 |
| 2,491,589 | Slaughter | Dec. 20, 1949 |
| 2,494,273 | Wigal | Jan. 10, 1950 |
| 2,600,254 | Lysobey | June 10, 1952 |
| 2,668,324 | Johnson | Feb. 9, 1954 |